United States Patent
Sato et al.

(10) Patent No.: US 8,726,708 B2
(45) Date of Patent: May 20, 2014

(54) ROLLER HEMMING DEVICE USING ROBOT MANIPULATOR WITH FORCE SENSOR

(75) Inventors: Takashi Sato, Yamanashi (JP); Ko Gika, Yamanashi (JP)

(73) Assignee: Fanuc Corporation, Minamitsuru-Gun, Yamanashi (JP)

( * ) Notice: Subject to any disclaimer, the term of this patent is extended or adjusted under 35 U.S.C. 154(b) by 658 days.

(21) Appl. No.: 12/907,321

(22) Filed: Oct. 19, 2010

(65) Prior Publication Data
US 2011/0107807 A1 May 12, 2011

(30) Foreign Application Priority Data
Nov. 12, 2009 (JP) ................................. 2009-259110

(51) Int. Cl.
*B21B 37/58* (2006.01)
*B21D 7/02* (2006.01)

(52) U.S. Cl.
USPC .................. 72/10.4; 72/10.2; 72/10.3; 72/220

(58) Field of Classification Search
USPC ............ 72/10.1, 10.4, 82, 84, 214, 220, 21.1, 72/21.4, 10.3, 443; 700/148, 150, 245, 700/253, 260; 29/243.57, 243.58
See application file for complete search history.

(56) References Cited

U.S. PATENT DOCUMENTS

| | | | | |
|---|---|---|---|---|
| 4,509,351 | A * | 4/1985 | Rolin et al. | 72/10.4 |
| 5,220,817 | A * | 6/1993 | Wenzel et al. | 72/84 |
| 5,901,595 | A * | 5/1999 | Massee | 72/81 |
| 6,694,793 | B1 * | 2/2004 | Persson | 72/220 |
| 7,134,304 | B2 * | 11/2006 | Nakayama et al. | 72/102 |
| 7,500,373 | B2 * | 3/2009 | Quell | 72/214 |
| 7,584,636 | B2 * | 9/2009 | Arai | 72/10.4 |
| 7,637,134 | B2 | 12/2009 | Burzlaff et al. | |
| 8,335,591 | B2 * | 12/2012 | Takahashi | 700/260 |
| 2004/0035172 | A1 * | 2/2004 | Sawa | 72/214 |
| 2008/0022741 | A1 * | 1/2008 | Arai | 72/82 |
| 2008/0245124 | A1 * | 10/2008 | Chaker et al. | 72/214 |
| 2008/0250835 | A1 * | 10/2008 | Hasegawa et al. | 72/220 |
| 2010/0242561 | A1 * | 9/2010 | Reith et al. | 72/252.5 |

FOREIGN PATENT DOCUMENTS

| | | |
|---|---|---|
| CN | 101356026 A | 1/2009 |
| DE | 10011854 A1 | 9/2001 |
| DE | 102005004474 B3 | 8/2006 |
| DE | 102006003555 A1 | 7/2007 |

(Continued)

OTHER PUBLICATIONS

Office Action issued by the German Patent Office on Sep. 20, 2012 in corresponding Application No. DE 10 2010 051 025.4, with English translation.

(Continued)

*Primary Examiner* — Edward Tolan
(74) *Attorney, Agent, or Firm* — Lowe Hauptman & Ham, LLP (57) ABSTRACT

A roller hemming device capable of correcting a positional error between a robot manipulator and a workpiece, and carrying out a pre-hemming and/or hemming process with appropriate pressing force. The roller hemming device has a position detecting part adapted to detect a current position of a roller attached to a front end of the robot manipulator; a force sensor arranged between a wrist section of the robot manipulator and the roller; and a controller adapted to control the position of the roller by using an output of the position detecting part and an output of the force sensor, so that pressing force applied to a mold by the roller is a predetermined value.

7 Claims, 5 Drawing Sheets

(56) References Cited

FOREIGN PATENT DOCUMENTS

| | | |
|---|---|---|
| DE | 102006003556 A1 | 8/2007 |
| DE | 102007036704 A1 | 4/2008 |
| DE | 102007002008 A1 | 7/2008 |
| DE | 102007024777 A1 | 11/2008 |
| DE | 102007060680 A1 | 6/2009 |
| DE | 102009058817 A1 | 8/2010 |
| DE | 102010003697 A1 | 10/2011 |
| JP | 61-262432 A | 11/1986 |
| JP | 02015956 A | 1/1990 |
| JP | 03184786 A | 8/1991 |
| JP | 04164585 A | 6/1992 |
| JP | 05-305357 A | 11/1993 |
| JP | 06278007 A | 10/1994 |
| JP | 06312343 A | 11/1994 |
| JP | 07-060370 A | 3/1995 |
| JP | 2003-103325 A | 4/2003 |
| JP | 2006-088217 A | 4/2006 |
| WO | 2007077377 | 12/2007 |
| WO | 2008145396 A1 | 12/2008 |

OTHER PUBLICATIONS

Wulfsberg, Jens P., et al.: Kraftgeregeltes Rollfalzen, Munchen, Carl Hanser Verlag, 2005, Mar. 2005.

A German Office Action, dated May 23, 2012 issued in German Application No. 10 2010 051 025.4.

Japanese Office Action for Application No. 2009-259110, mailed Mar. 8, 2011.

Chinese Office Action dated Jan. 15, 2013 issued in Application No. 201010517428.5.

* cited by examiner

ROLLER HEMMING DEVICE USING ROBOT MANIPULATOR WITH FORCE SENSOR

RELATED APPLICATIONS

The present application claims priority from Japanese Patent Application No. 2009-259110, filed on Nov. 12, 2009, the entire contents of which are fully incorporated herein by reference.

BACKGROUND OF THE INVENTION

1. Field of the Invention

The present invention relates to a roller hemming device adapted to carry out a pre-hemming process and/or hemming process, using a robot manipulator to which a roller is attached 2. Description of the Related Art In a roller hemming process wherein two metal sheets are joined so as to form a door panel or the like of an automobile, a peripheral edge of an outer sheet of the two metal sheets is vertically bent along the entire circumference thereof, the outer sheet is fixed to a mold, an inner sheet of the two metal sheets is stacked on the outer sheet, and then the two sheets are joined by pressing a roller attached to a robot manipulator against the peripheral edge of the outer sheet. In this regard, a process for further bending the vertically bent edge of the outer sheet by 45 degrees is referred to as a "pre-hemming process," and a process for further bending the vertically bent edge of the outer sheet by 90 degrees (i.e., the peripheral edge becomes flattened) is referred to as a "hemming process."

In order to obtain high processing quality, it is necessary to apply sufficient pressing force to the peripheral edge during the pre-hemming and/or hemming process. In the prior art, the pressing force is generated by a spring, hydraulic equipment or a servomotor, which is arranged in a tool at a wrist portion of a robot manipulator. For example, Japanese Unexamined Patent Publication (Kokai) No. 61-262432 discloses a roller hemming device having a robot hand and a hem roller attached to a front end of the robot hand, wherein the hem roller is rotationally driven by a motor arranged in the robot hand.

The pressing force of the hem roller or the pre-hem roller against a workpiece is an important factor for the pre-hemming or hemming process. For example, Japanese Unexamined Patent Publication (Kokai) No. 5-305357 discloses a roller hemming device having a hem roller adapted to move in a pressing direction, wherein the hem roller may press a workpiece to be hemmed by an appropriate pressing force along an accurate trajectory, even if a robot hand is deflected.

The processing quality or the shape of bent workpiece depends on the positional accuracy of the robot manipulator, since the roller is moved by the robot manipulator or the robot hand. In order to improve the positional accuracy, some techniques for reducing or eliminating positional error of the manipulator have been proposed. For example, Japanese Unexamined Patent Publication (Kokai) No. 7-60370 discloses a hemming device wherein a receiving roller and a pressing roller are arranged at a wrist section of a robot manipulator so that the positional relationship between the two rollers may be changed by means of a cylinder, in view of the deterioration of processing accuracy due to creep or displacement of a joint of the robot manipulator generated by a force applied to the manipulator during processing.

Furthermore, Japanese Unexamined Patent Publication (Kokai) No. 2003-103325 discloses a roller hemming device wherein a workpiece and a peripheral edge of a pedestal are nipped between hem rollers and driven rollers so as to carry out a hemming process.

Still furthermore, Japanese Unexamined Patent Publication (Kokai) No. 2006-88217 discloses a roller hemming device having a guide rail positioned at the end of a peripheral flange of a pedestal, the guide rail being adapted to guide at least one of a hem roller or a pre-hem roller along a traveling direction of the process.

In the invention of Japanese Unexamined Patent Publication (Kokai) No. 61-262432, the hemming process may not be properly carried out due to a positional error on the robot manipulator relative to the workpiece. In the invention of Japanese Unexamined Patent Publication (Kokai) No. 5-305357, creep of displacement may occur at a bearing or the like of the joint of the robot, due to external force applied to the robot hand during the hemming process. In the invention of Japanese Unexamined Patent Publication (Kokai) No. 7-60370 or Japanese Unexamined Patent Publication (Kokai) No. 2003-103325, although the positional accuracy of the roller relative to the workpiece may be improved, many kinds of rollers are necessary, and thus the structure of the tool becomes complicated and cost thereof may be increased, and/or the reliability of the tool may be deteriorated. Furthermore, in the invention of Japanese Unexamined Patent Publication (Kokai) No. 2006-88217, it is necessary to arrange the guide rail for guiding the roller at the mold, and the mold is necessary to be prepared corresponding to each kind of workpiece. Therefore, it is troublesome to arrange the guide rail at the corresponding mold, which is disadvantageous in view of cost.

When the workpiece has a curved portion, high processing quality may be obtained by varying the pressing force depending on the location in the workpiece. However, it is difficult to vary the pressing force during roller hemming process.

SUMMARY OF THE INVENTION

An object of the present invention is to provide a roller hemming device capable of correcting the positional error between the robot manipulator and the workpiece, and carrying out high quality pre-hemming and/or hemming process with appropriate pressing force.

According to the present invention, there is provided a roller hemming device having robot manipulator and a roller attached to a front end of the robot manipulator, adapted to carry out pre-hemming or hemming process for a workpiece constituted by an outer sheet mounted on a mold and an inner sheet stacked on the outer sheet, the roller adapted to be moved while being pressed against a peripheral edge of the outer sheet so that the peripheral edge of the outer sheet nipped between the roller and the mold is bent, the roller hemming device comprising: a position detecting part adapted to detect a current position of the roller; a force measuring part arranged between a wrist section of the robot manipulator and the roller; and a controlling part adapted to control the position of the roller by using an output of the position detecting part and an output of the force measuring part, so that pressing force applied to the mold by the roller is a predetermined value.

In a preferred embodiment, the controlling part controls the position of the roller by using an output of the position detecting part and an output of the force measuring part, so that pressing force applied to the mold by the roller is a predetermined value and moment applied to the roller is a predetermined value.

In a preferred embodiment, the roller hemming device further comprises: a positional error calculating part adapted to calculate a positional error of the robot manipulator relative to the peripheral edge of the outer sheet, based on the force and moment obtained from the force measuring part and information regarding the shape of the roller; and a start point correcting part adapted to correct a start point for the pre-hemming or hemming process based on the positional error.

In a preferred embodiment the roller hemming device further comprises a first movement controlling part adapted to control the movement of the roller so that a predetermined force is applied to the roller in a direction perpendicular to both the pressing direction of the roller against the mold and a traveling direction of the roller, by using the output of the force measuring part, during the pre-hemming or hemming process.

In a preferred embodiment the roller hemming device further comprises a second movement controlling part adapted to determine force applied to the roller along a traveling direction of the roller, and control the movement of the roller so that the determined force is within a predetermined range, by using the output of the force measuring part, during the pre-hemming or hemming process.

In a preferred embodiment the roller hemming device further comprises a pressing force changing part adapted to determine a traveling speed of the roller during the pre-hemming or hemming process based on the position of the roller obtained from the position detecting part, and change the pressing force of the roller against the mold depending on a change of the traveling speed of the roller.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
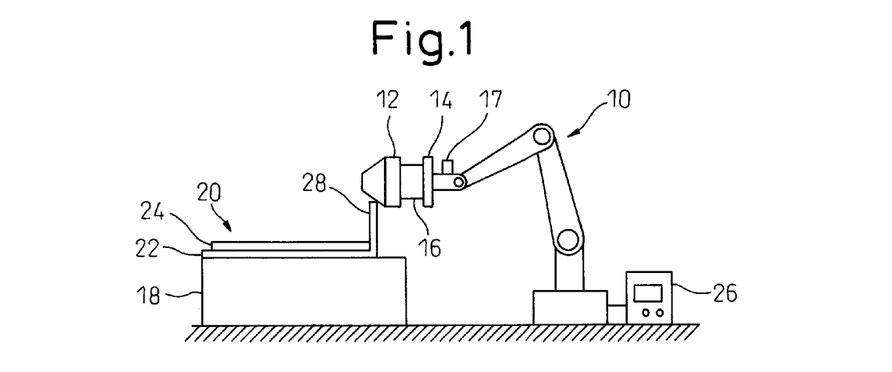
FIG. 1 shows a schematic configuration of a roller hemming device according to an embodiment of the present invention.

FIG. 1 shows a schematic configuration of a roller hemming device according to the present invention. A roller is attached to a front end of an arm of a robot manipulator (hereinafter, referred to as "robot") 10. In detail, a pre-hem roller 12 or a hem roller 34 (as described below) is attached to a wrist element 14 of robot 10 and a force sensor 16 is arranged between the roller and wrist element 14. Force sensor 16 is adapted to measure force (pressing force) applied to pre-hem roller 12 or hem roller 34 and output information of the force. An object or a workpiece 20 to be processed is located on a mold 18, and workpiece 20 has an outer sheet 22 such as a metal sheet mounted on mold 18 and an inner sheet 24 such as a metal sheet stacked or superimposed on outer sheet 22. A controller 26 connected to robot 10 may control the motion of robot 10 to carry out pre-hemming or hemming process as described below.

Robot 10 has a position detecting part adapted to detect the current position of the pre-hem roller or the hem roller attached to the front end of the robot arm and output the detected position. The position detecting part may be a position detector (not shown) such as an encoder arranged on a servomotor or the like (not shown) which drives each axis of robot 10, or a position sensor 17, the positional relationship of which relative to the pre-hem roller or the hem roller is previously determined. Another known means may be used as the position detecting part.

In the roller hemming device of the invention, similarly to a conventional hemming device, a peripheral edge 28 of outer sheet 22 is previously vertically bent along whole circumference thereof. Then, outer sheet 22 is fixed to mold 18 and inner sheet 24 is positioned or stacked on outer sheet 22. Next, the roller attached to robot 10 is pressed against peripheral edge 28 of outer sheet 22 so as to bond the two sheets. In the pre-hemming process using pre-hem roller 12, peripheral edge 28 is bent by 45 degrees along whole circumference thereof, and in the following hemming process using the hem roller, peripheral edge 28 is bent so that the edge is stacked on inner sheet 24 and flattened.

Figure 2:
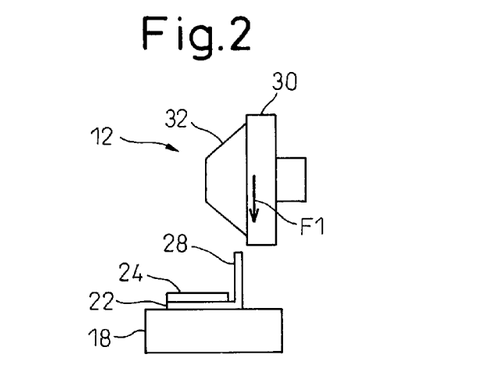
FIG. 2 shows an example of the shape of a pre-hem roller.
Figure 3:
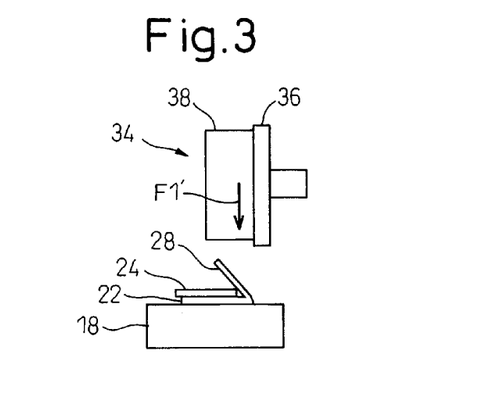
FIG. 3 shows an example of the shape of a hem roller.

FIG. 2 shows an example of the shape of pre-hem roller 12. Pre-hem roller 12 has a flange 30 and a conical or truncated conical part 32 coaxially arranged with flange 30. FIG. 3 shows an example of the shape of hem roller 34 for the hemming process. Hem roller 34 has a flange 36 and a cylindrical part 38 coaxially arranged with flange 36. Due to such shapes of the rollers, pressing by the roller in the lateral direction can be properly carried out, as well as in the downward direction of the roller, whereby a positional error of the workpiece at a start point or during processing may be corrected. This will be explained below. In the illustrated embodiment, the pre-hem roller for pre-hemming process and the hem roller for hemming process are discrete components. However, it is possible to use one roller for both of pre-hemming and hemming processes by changing an angle of pressing of the roller relative to the mold.

Figure 4:
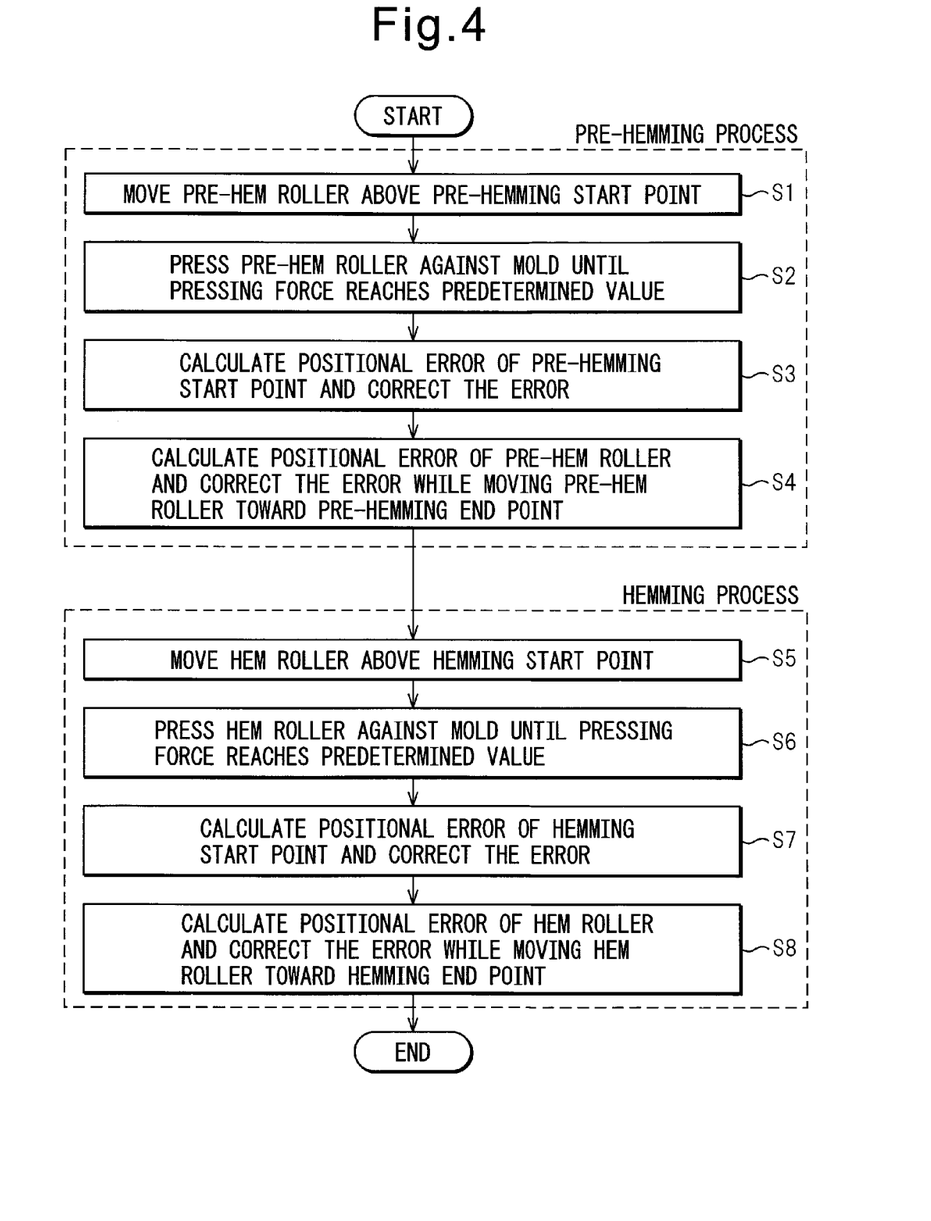
FIG. 4 is a flowchart indicating a process by the roller hemming device of the invention.

Next, the procedure of pre-hemming and hemming processes, using the roller hemming device of the invention, will be explained. FIG. 4 is a flowchart showing the procedure of roller hemming process using the roller hemming device. Before carrying out the roller hemming process, the following preparations are necessary.

a. Teaching a pre-hemming start point for pre-hemming process and a hemming process start point for hemming process
b. Teaching a movement trajectory of the roller from the start point to an end point, in each of pre-hemming process and hemming process
c. Determining the setting (or appropriate) values of pressing force to be applied to the mold at the pre-hemming and hemming start points, by an experiment or the like.
d. Calculating a coordinate of a contact point in a force sensor coordinate system 25, as a preparation for correcting a positional error between the roller and the workpiece by using a method 1 as below, the contact point being an ideal contact point between the roller and the workpiece without the positional error. The coordinate of the contact point may be calculated on the basis of the shape of the roller, or determined by an experiment. In addition, the force sensor coordinate system means an orthogonal coordinate system fixed to a force sensor (see FIG. 7a).
e. Calculating a traveling distance of the roller, as a preparation for correcting the positional error between the roller and the workpiece by using a method 2 as below, the traveling distance being an ideal traveling distance of the roller from where the roller comes into contact with the workpiece to where the roller sits on the mold, without the positional error. The traveling distance may be calculated on the basis of the shape of the roller, or determined by an experiment or the like.
f. determining the setting (or appropriate) values of pressing force to the mold during pre-hemming or hemming process, reaction force in the traveling direction, and/or pressing force in the direction perpendicular to both the pressing direction to the mold and the traveling direction, by an experiment or the like.

Hereinafter, each step of the flowchart of FIG. 4 will be explained. Although any arithmetic processing as below may be carried out by controller 26 as described above, another unit having a similar function may be used instead.

Step S1

Figure 5:
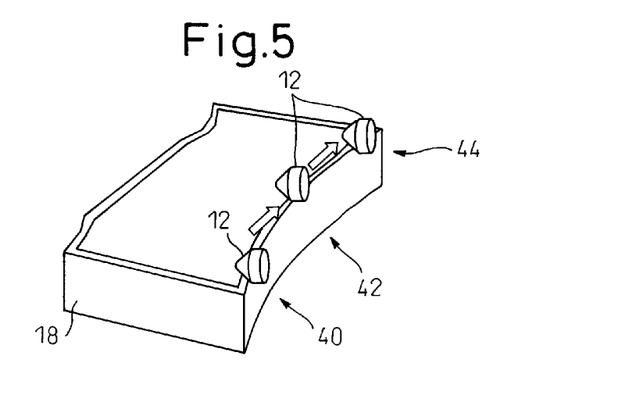
FIG. 5 shows a schematic view explaining a processing trajectory in the pre-hemming process.

As shown in FIG. 2 and FIG. 5 viewing mold 18 from obliquely above, pre-hem roller 12 is moved above pre-hemming start point 40. In the example of FIG. 5, pre-hemming and hemming processes are carried out from start point 40 to end point 44 via intermediated point 42. As shown in FIG. 2, at start point 40, pre-hem roller 12 is taught so as to be positioned above outer sheet 22.

Step S2

Figure 6A:
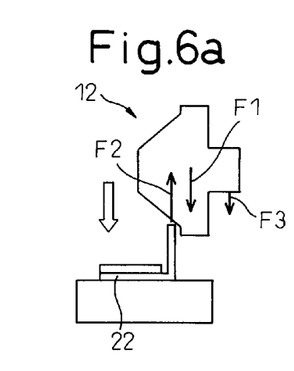
FIG. 6a is a diagram showing the positional relationship between the pre-hem roller and the workpiece during the pre-hemming process, wherein the pre-hem roller contacts a peripheral edge of an outer sheet of the workpiece.
Figure 6B:
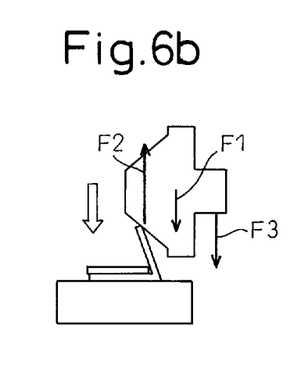
FIG. 6b is a diagram showing the positional relationship between the pre-hem roller and the workpiece during the pre-hemming process, wherein the pre-hem roller is lowered and the peripheral edge is bent.
Figure 6C:
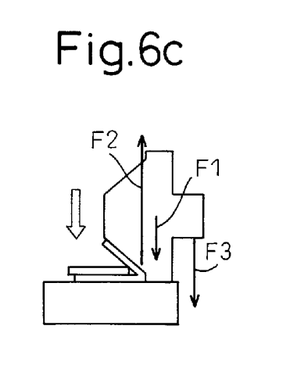
FIG. 6c is a diagram showing the positional relationship between the pre-hem roller and the workpiece during the pre-hemming process, wherein the pre-hem roller is further lowered and the peripheral edge is bent by a predetermined angle (or the roller sits on the mold)

As shown in FIGS. 6a to 6c, pre-hem roller 12 is pressed against mold 18 until the pressing force of roller 12 reaches a predetermined value. Although the pressing direction is vertically downward in the embodiment, the pressing direction is not limited as such. First, at pre-hemming start point 40 (or before the pre-hem roller contacts the workpiece), vertical force component F1 applied to pre-hem roller 12 is detected by means of force sensor 16 attached to wrist element 14 of robot 10 (FIG. 2). In the example of FIG. 2, vertical force component F1 is generally equal to own weight of pre-hem roller 12.

Then, after pre-hem roller 12 is lowered so as to contact peripheral edge 28 of outer sheet 22 (FIG. 6a), vertical force component F2 applied to pre-hem roller 12 is detected by means of force sensor 16. Since pre-hem roller 12 is considered to come into contact with peripheral edge 28 of outer sheet 22 when force component F2 is detected, next step S3 (correction of the positional deviation of the pre-hemming start point) is carried out at the time of contact between the pre-hem roller and the peripheral edge if "Method 1" as described below is employed. Since force component F2 corresponds to the pressing force applied to peripheral edge 28, vertical force F3 (=F2−F1) corresponds to a vertical force applied to the pre-hem roller by the robot. Force F3 applied to the pre-hem roller by the robot is controlled so that pressing force F2 is equal to a set value F0 required for bending outer sheet 22 in a predetermined shape (for example, by 45 degrees as shown in FIG. 6c). As a method for controlling the force, impedance control, damping control or hybrid control may be used. However, detailed explanation thereof is omitted since these methods are conventional. It is preferable that set value F0 is sufficiently large, since pre-hem roller 12 should contact mold 18 in the pre-hemming process as shown in FIG. 6c. In addition, it is preferable that value F0 is previously determined by an experiment or the like, since force required for bending outer sheet 22 in a predetermined shape (for example, by 45 degrees) may vary depending on material and/or thickness of the workpiece.

Step S3

In this step, a deviation of the position of pre-hemming start point 40 (hereinafter, also referred to as positional deviation) is calculated. When the positional deviation exceeds a predetermined threshold, the position of pre-hemming start point 40 is corrected. Concretely, the positional deviation of pre-hemming start point 40 may be calculated, by using force information and moment information obtained from force sensor 16; the current position of the wrist element of robot 10, based on forward kinematics, obtained from a position detector arranged on a motor (not shown) of robot 10; and data or information regarding the shape of pre-hem roller 12. When the calculated positional deviation is larger than a predetermined threshold, the position of robot 10 at pre-hemming start point 40 is corrected. Due to this, the pre-hem roller is prevented from separating from the workpiece or from unduly pressing the workpiece, even when a positional deviation exists between a surface of the workpiece and a previously taught trajectory for the robot.

Hereinafter, two concrete methods for calculating the positional deviation in step S3 will be explained.

Method 1

In method 1, changes in force and moment before and after the pre-hem roller contacts the peripheral edge of the outer sheet are utilized so as to correct the positional deviation of the pre-hemming start point.

Figure 7A:
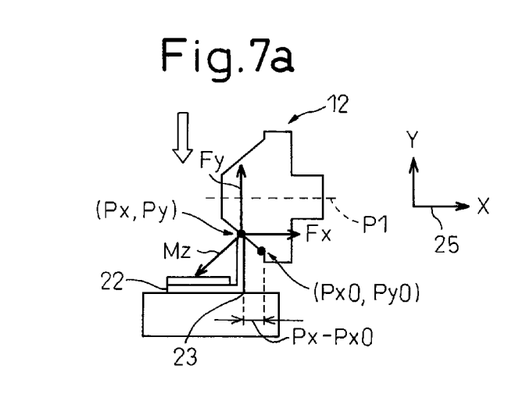
FIG. 7a is a diagram explaining calculating of the positional error between the pre-hem roller and the workpiece.

As shown in FIG. 7a, pre-hem roller 12 is moved downward (or toward mold 18), and then the force change F and the moment change M of before and after pre-hem roller 12 contacts peripheral edge 28 of outer sheet 22 are detected by means of force sensor 16. In this regard, components of F in X-, Y- and Z-directions in a force sensor coordinate system are referred to as Fx, Fy and Fz, respectively, and components of M in X-, Y- and Z-directions in the force sensor coordinate system are referred to as Mx, My and Mz, respectively. A coordinate (Px0, Py0) as shown in FIG. 7a means a contact point between the pre-hem roller and the workpiece in the force sensor coordinate system, under ideal condition with no positional deviation. In the ideal condition, the contact point is positioned on a boundary between flange 30 and truncated conical part 32 of pre-hem roller 12. On the other hand, a coordinate (Px, Py) means the contact point between the pre-hem roller and the workpiece in the force sensor coordinate system, under real condition. X-coordinate Px is equal to an X-coordinate of an outer edge 23 of outer sheet 22 in the force sensor coordinate system.

A positional deviation of the workpiece (Px−Px0) may be calculated by using Fx, Fy, Mz and the shape of the pre-hem roller, as described below. First, on the basis of physical relationship between force and moment, the following equation (1) is true.

$$Mz = FyPx - FxPy \quad (1)$$

Further, the following equation (2) is introduced on the basis of geometric configuration.

$$Py - Py0 = k(Px - Px0) \quad (2)$$

Since the force sensor and the pre-hem roller are fixed relative to the robot and the position of the pre-hem roller is constant in the force sensor coordinate system, "k" in equation (2) is a constant. For example, if an inclined angle of truncated conical part 32 of the pre-hem roller is 45 degrees, as shown in FIG. 7a, "k" is equal to one.

Due to equations (1) and (2), following equation (3) for calculating positional deviation (Px−Px0) is derived.

$$Px - Px0 = (Mz + FxPy0 - FyPx0)/(Fy - kFx) \quad (3)$$

Figure 7B:
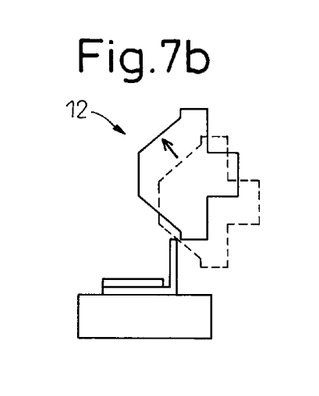
FIG. 7b is a diagram showing the state wherein the pre-hem roller is moved to correct the positional error.

When positional deviation (Px−Px0) calculated in equation (3) is larger than a predetermined threshold, as shown in FIG. 7b, pre-hem roller 12 is moved from a position as indicated by a dashed line (corresponding to FIG. 7a) to a position as indicated by a solid line, so that the calculated positional deviation is reduced, whereby the positional deviation of the pre-hemming start point is corrected. In addition, coordinate (Px0, Py0) of the contact point, between the pre-hem roller and the workpiece in the force sensor coordinate system under ideal condition, may be calculated based on the shape of the pre-hem roller or an experiment wherein precise teaching is carried out.

Method 2

In method 2, a distance of movement of the robot, from where the pre-hem roller contacts the workpiece to where the pre-hem roller contacts the mold, is utilized so as to correct the positional deviation of the pre-hemming start point.

Figure 8A:
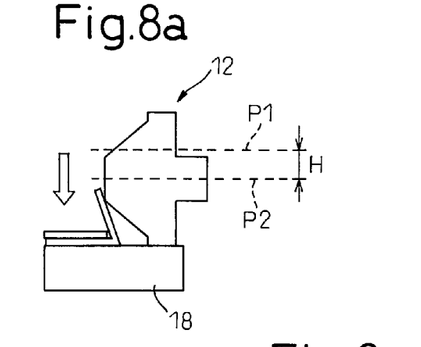
FIG. 8a is a diagram explaining another way of calculating the positional error between the pre-hem roller and the workpiece.
Figure 8B:
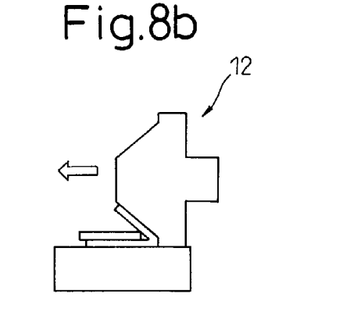
FIG. 8b is a diagram showing the state wherein the pre-hem roller is moved to correct the positional error.

As shown in FIG. 7a, pre-hem roller 12 is moved downward (or toward mold 18), and then a robot position P1 is recorded when force sensor 16 detects that pre-hem roller 12 contacts peripheral edge 18 of outer sheet 22. Next, as shown in FIG. 8a, pre-hem roller 12 is pressed against the workpiece with a predetermined pressing force, and then a robot position P2 is recorded when pre-hem roller 12 contacts mold 18. Whether the pre-hem roller contacts the mold or not can be judged by the fact that the pre-hem roller cannot be moved in the pressing direction while the pressing force is kept at a predetermined value. Then, the distance of movement H of the pre-hem roller is calculated by comparing P1 to P2. When the distance of movement H is smaller than the predetermined value, it is judged that a significant positional deviation exists, and then the pre-hem roller is moved or pressed against the workpiece (in the left direction in the illustrated embodiment) so that the positional deviation is reduced, as shown in FIG. 8b. By pressing the pre-hem roller against the workpiece in the left direction until the pressing force reaches the predetermined value, the positional deviation between the robot and the workpiece may be corrected.

Step S4

Figure 9:
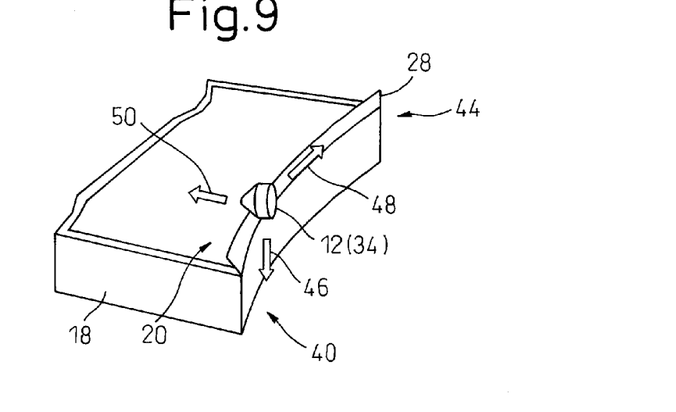
FIG. 9 is a diagram explaining force applied to the roller during the process.

While applying a predetermined pressing force to the workpiece, pre-hem roller 12 is moved along the trajectory from start point 40 to end point 44, as shown in FIG. 5. During the pre-hemming process, as shown in FIG. 9, the robot is controlled by using force information and moment information from the force sensor, so that the pressing force applied to mold 18 is kept at a predetermined value while the pre-hem roller is moved from start point 40 to end point 44. The pre-hem roller is pressed in a direction 46 (a vertically downward direction in the embodiment), and is also pressed in a direction 50 perpendicular to both direction 46 and a traveling direction 48 (along the processing trajectory) so that the force in direction 50 is kept at a predetermined value. Due to this, even if the taught trajectory is offset from the workpiece, pre-hem roller 12 is prevented from separating from workpiece 20 or from unduly pressing workpiece 20, whereby the bending angle of the workpiece in the pre-hemming process may be constant.

In normal pre-hemming process, the force sensor attached to the proximal part of the pre-hem roller is subjected to reaction force F and moment M from the front side in the traveling direction of the roller. Force F and moment M are (preferably always) monitored, and the traveling speed of the pre-hem roller is controlled so that force F and moment M are within a predetermined range (Fmin≤F≤Fmax, Mmin≤M≤Mmax). Due to this, the reaction force and/or the moment is prevented from widely fluctuating during processing, whereby the processing quality may be improved. In addition, it is preferable that the predetermined ranges of F and M (Fmin, Fmax; Mmin, Mmax) are previously determined by an experiment or the like, since the ranges may vary depending on material and/or thickness of the workpiece, and/or the traveling speed of the roller.

Steps S1 to S4 as described above relate to the pre-hemming process, and steps S5 to S8 as described below relate to the hemming process.

Step S5

Hem roller 34 as shown in FIG. 3 is moved above hemming start point 40 (FIG. 5). Similarly to the pre-hemming process, hemming processes is carried out from start point 40 to end point 44 via intermediated point 42. Similarly to step S1, hem roller 34 is taught so as to be positioned above outer sheet 22.

Step S6

Similarly to step S2, hem roller 34 is pressed against mold 18 until the pressing force by hem roller 34 reaches a predetermined value. Although the pressing direction is vertically downward in the embodiment, the pressing direction is not limited as such. First, at hemming start point 40 (or before the hem roller contacts the workpiece), vertical force component F1' applied to hem roller 34 is detected by means of force sensor 16 attached to wrist element 14 of robot 10 (FIG. 3). In the example of FIG. 3, vertical force component F1' is generally equal to the weight of hem roller 34.

Figure 10A:
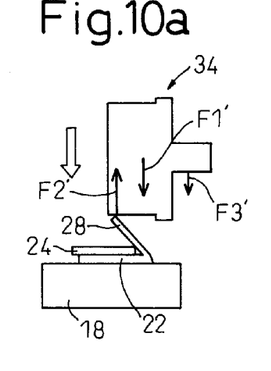
FIG. 10a is a diagram showing the positional relationship between the hem roller and the workpiece during the hemming process, wherein the hem roller contacts the peripheral edge of the outer sheet of the workpiece.
Figure 10B:
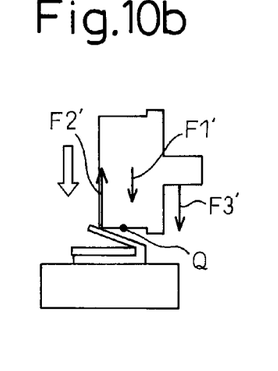
FIG. 10b is a diagram showing the positional relationship between the hem roller and the workpiece during the hemming process, wherein the hem roller is lowered and the peripheral edge is bent.
Figure 10C:
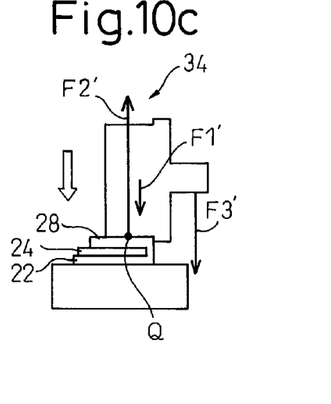
FIG. 10c is a diagram showing the positional relationship between the hem roller and the workpiece during the hemming process, wherein the hem roller is further lowered and the peripheral edge is bent by a predetermined angle (or the outer sheet is partially stacked on the inner sheet)

Then, after hem roller 34 is lowered so as to contact peripheral edge 28 of outer sheet 22 (FIG. 10a), vertical force component F2' applied to hem roller 34 is detected by means of force sensor 16. Since force component F2' corresponds to the pressing force applied to peripheral edge 28, vertical force F3' (=F2'−F1') corresponds to a vertical force applied to the hem roller by the robot. Force F3' applied to the hem roller by the robot is controlled so that pressing force F2' is equal to a set value F0' required for bending outer sheet 22 in a predetermined shape (for example, the state wherein peripheral edge 28 of outer sheet 22 is stacked on inner sheet 24). As a method for controlling the force, impedance control, damping control or hybrid control may be used. However, the detailed explanation thereof is omitted since these methods are conventional. It is preferable that the set value F0' is sufficiently large, since hem roller 34 should contact mold 18 in the hemming process as shown in FIG. 10c. In addition, it is preferable that value F0' is previously determined by an experiment or the like, since force required for bending outer sheet 22 in a predetermined shape (for example, the state wherein peripheral edge 28 of outer sheet 22 is stacked on inner sheet 24) may vary depending on material and/or thickness of the workpiece.

In case that hem roller 34 closely contacts mold 18 as shown in FIG. 10c, the moment applied to point Q in the force sensor coordinate system (FIG. 11) should be noted. Concretely, when hem roller 34 is being moved as shown in FIG. 10b, force F2' is applied to a point of hem roller 34 other than Q, whereby moment larger than zero is applied to point Q by the force from outer sheet 22. On the other hand, hem roller 34 is positioned as shown in FIG. 10c, cylindrical part 38 of hem roller 34 closely contacts outer sheet 22 and then force F2' is applied to point Q, whereby moment applied to point Q due to the force from outer sheet 22 is equal to or approximately equal to zero.

Step S7

Similarly step S3, a deviation of the position of hemming start point 40 (hereinafter, also referred to as positional deviation) is calculated. When the positional deviation exceeds a predetermined threshold, the position of hemming start point 40 is corrected. When the positional deviation is larger than a predetermined threshold, the position of robot 10 at hemming start point 40 is corrected. Due to this, the hem roller is prevented from separating from the workpiece or from unduly pressing the workpiece, even when a positional deviation exists between a surface of the workpiece and a previously taught trajectory for the robot. In addition, if the hemming start point coincides with the pre-hemming start point and the positional deviation between the robot and the workpiece has already been corrected in the pre-hemming start point, step S7 may be omitted.

Hereinafter, method 3 for calculating the positional deviation in step S7 will be explained.

Method 3

In method 3, a distance of the movement of the robot, from where the hem roller contacts the workpiece to where the hem roller contacts the mold, is utilized so as to correct the positional deviation of the hemming start point.

Figure 11:
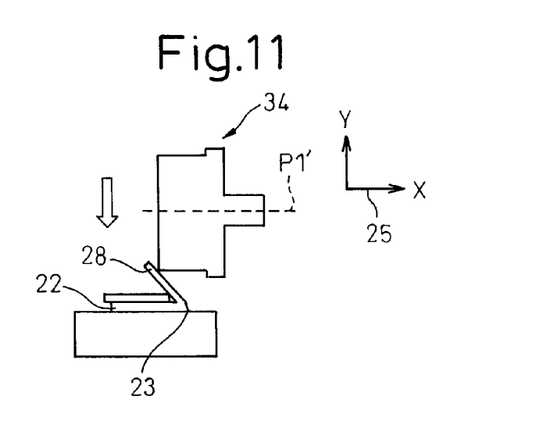
FIG. 11 is a diagram explaining calculating of the positional error between the hem roller and the workpiece.
Figure 12A:
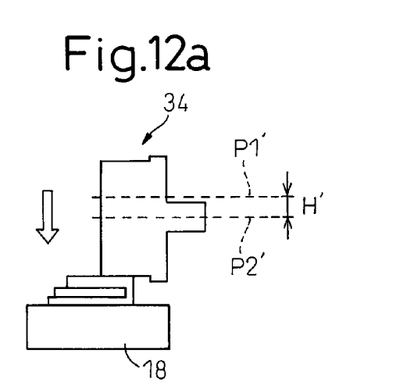
FIG. 12a is a diagram explaining another way of calculating the positional error between the hem roller and the workpiece.
Figure 12B:
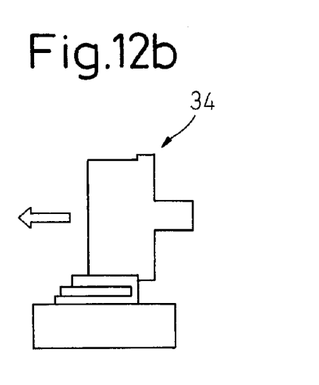
FIG. 12b is a diagram showing the state wherein the hem roller is moved to correct the positional error.

As shown in FIG. 11, hem roller 34 is moved downward (or toward mold 18), and then a robot position P1' is recorded when force sensor 16 detects that hem roller 34 contacts peripheral edge 18 of outer sheet 22. Next, as shown in FIG. 12a, hem roller 34 is pressed against the workpiece with a predetermined pressing force, and then a robot position P2' is recorded when hem roller 34 contacts mold 18. Whether the hem roller contacts the mold or not can be judged by the fact that the hem roller cannot be moved in the pressing direction while the pressing force is kept at a predetermined value. Then, distance of movement H' of the hem roller is calculated by comparing P1' to P2'. When distance of movement H' is smaller than the predetermined value, it is judged that a significant positional deviation exists, and then the hem roller is moved or pressed against the workpiece (in the left direction in the illustrated embodiment) so that the positional deviation is reduced, as shown in FIG. 12b. By pressing the hem roller against the workpiece in the left direction until the pressing force reaches the predetermined value, the positional deviation between the robot and the workpiece may be corrected.

Step S8

While applying a predetermined pressing force to the workpiece, hem roller 34 is moved along the trajectory from start point 40 to end point 44, as shown in FIG. 5. During the hemming process, as shown in FIG. 9, the robot is controlled by using force information and moment information from the force sensor, so that the pressing force applied to mold 18 is kept at a predetermined value while the hem roller is moved from start point 40 to end point 44. The hem roller is pressed in a direction 46 (a vertically downward direction in the embodiment), and is also pressed in a direction 50 perpendicular to both of direction 46 and a traveling direction 48 (along the processing trajectory) so that the force in direction 50 is kept at a predetermined value. Due to this, even if the taught trajectory is offset from the workpiece, hem roller 34 is prevented from separating from workpiece 20 or from unduly pressing workpiece 20, whereby the bending angle of the workpiece in the hemming process may be constant.

In normal hemming process, the force sensor attached to the proximal part of the hem roller is subjected to reaction force F' and moment M' from the front side in the traveling direction of the roller. Force F' and moment M' are (preferably always) monitored, and the traveling speed of the hem roller is controlled so that force F' and moment M' are within a predetermined range (F'min≤F'≤F'max, M'min≤M'≤M'max). Due to this, the reaction force and/or the moment is prevented from widely fluctuating during processing, whereby the processing quality may be improved. In addition, it is preferable that the predetermined ranges of F' and M' (F'min, F'max; M'min, M'max) are previously determined by an experiment or the like, since the ranges may vary depending on the material and/or thickness of the workpiece, and/or the traveling speed of the roller.

Figure 13:
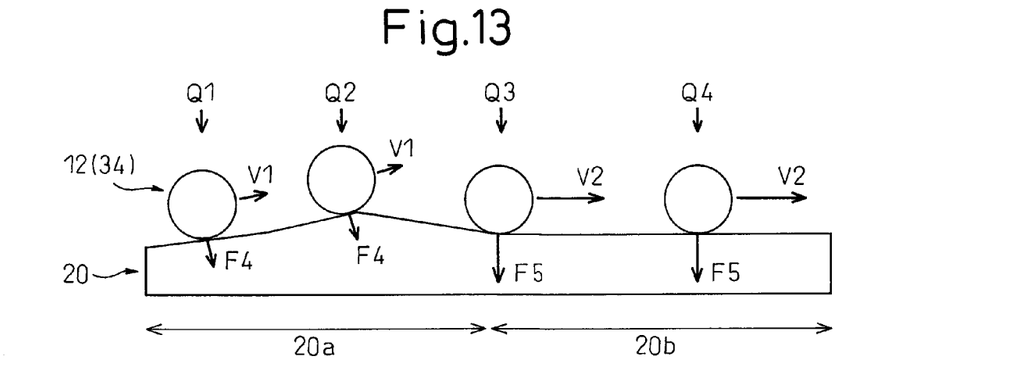
FIG. 13 shows an example wherein pressing force is changed depending on a traveling speed of the roller when the workpiece has a curved surface.

When it is necessary to vary the pressing force against the mold during pre-hemming or hemming process, the pressing force may be varied in step S4 and/or step S8. For example, when the workpiece has a curved portion, the traveling speed of the roller may be varied. In an example of FIG. 13, workpiece 20 has a curved portion 20a and a flat portion 20b. When roller 12 or 34 processes curved portion 20a (or the roller is located at position Q1 or Q2), the roller is moved at relatively low traveling speed v1, and when roller 12 or 34 processes flat portion 20b (or the roller is located at position Q3 or Q4), the roller is moved at relatively high traveling speed v2. In this case, depending on the change in the traveling speed of the roller, the pressing force may be properly controlled by means of the force sensor. For example, the pressing force is lowered (F4) when the traveling speed is small (v1) and the pressing force is raised (F5) when the traveling speed is large (v2), whereby the amount of bending angle of the workpiece may be equalized along peripheral edge 28 thereof.

According to the present invention, the positional deviation between the robot manipulator and the workpiece may be corrected without using a guide rail or the like, and precise pre-hemming or hemming process may be carried out without being subjected the positional deviation, whereby the quality of processing may be improved.

By using the pressing force and the moment of the roller, the positional deviation between the workpiece and the roller may be calculated by a simple equation.

The positional deviation between the robot manipulator and the workpiece may be calculated based on the position of the roller obtained from the position detecting part, the force and moment obtained from the force measuring part, and information regarding the shape of the roller. Due to this, the start point for the pre-hemming or hemming process may be corrected.

During the pre-hemming or hemming process, by controlling the movement of the roller so that a predetermined force is applied to the roller in a direction perpendicular to both the pressing direction of the roller against the mold and a traveling direction of the roller, the roller is prevented from separating from the trajectory to be followed and the quality of processing may be further improved.

By determining force applied to the roller along a traveling direction of the roller and controlling the movement of the roller so that the determined force is within a predetermined range during the pre-hemming or hemming process, the force applied to the roller is prevented from widely fluctuating, whereby the processing quality may be improved.

By determining a traveling speed of the roller during the pre-hemming or hemming process based on the position of the roller and changing the pressing force of the roller against the mold depending on a change in the traveling speed of the roller, the processing quality may be improved even when the workpiece has a curved portion.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. An apparatus, comprising:
a roller hemming device including:
a robot manipulator and a roller attached to a front end of the robot manipulator for carrying out at least one of a pre-hemming or hemming process for a workpiece having an outer sheet mounted on a mold and an inner sheet stacked on the outer sheet, the robot manipulator configured to move the roller while the roller is pressed against the peripheral edge of the outer sheet so that the peripheral edge of the outer sheet nipped between the roller and the mold is bent;
a position detector for detecting a current position of the roller;
a force measurer arranged between a wrist section of the robot manipulator and the roller; and
a controller for controlling the position of the roller by using an output of the position detector and an output of the force measurer, so that pressing force applied to the mold by the roller is a predetermined value,
wherein the controller controls the position of the roller by using an output of the position detector and an output of the force measurer, so that pressing force applied to the mold by the roller is a predetermined value and moment applied to the roller is a predetermined value,
and wherein the roller hemming device further comprises a movement controller for controlling the movement of the roller so that a predetermined force is applied to the roller in a direction perpendicular to both the pressing direction of the roller against the mold and a traveling direction of the roller, by using the output of the force measurer, during the pre-hemming or hemming process,
wherein the apparatus further comprises:
a calculator for calculating positional error of the robot manipulator relative to the peripheral edge of the outer sheet, based on the position of the roller obtained from the position detector, the force and moment obtained from the force measurer and information regarding the shape of the roller, wherein the apparatus is configured for correcting a start point for the pre-hemming or hemming process based on the positional error.

2. The apparatus according to claim 1, further comprising a force measurement device for determining a force applied to the roller along a traveling direction of the roller, wherein the apparatus is configured to control the movement of the roller so that the determined force is within a predetermined range, by using the output of the force measurement device, during the pre-hemming or hemming process.

3. The apparatus according to claim 2, further comprising a speed sensor for determining a traveling speed of the roller during the pre-hemming or hemming process based on the position of the roller obtained from the position detector, wherein the apparatus is configured to change the pressing force of the roller against the mold depending on a change in the traveling speed of the roller.

4. The apparatus according to claim 1, further comprising a speed sensor for determining a traveling speed of the roller during the pre-hemming or hemming process based on the position of the roller obtained from the position detector, wherein the apparatus is configured to change the pressing force of the roller against the mold depending on a change in the traveling speed of the roller.

5. An apparatus, comprising:
a roller hemming device including:
a robot manipulator and a roller attached to a front end of the robot manipulator for carrying out at least one of a pre-hemming or hemming process for a workpiece having an outer sheet mounted on a mold and an inner sheet stacked on the outer sheet, the robot manipulator configured to move the roller while the roller is pressed against the peripheral edge of the outer sheet so that the peripheral edge of the outer sheet nipped between the roller and the mold is bent;
a position detector for detecting a current position of the roller;
a force measurer arranged between a wrist section of the robot manipulator and the roller; and
a controller for controlling the position of the roller by using an output of the position detector and an output of the force measurer, so that pressing force applied to the mold by the roller is a predetermined value,
wherein the controller controls the position of the roller by using an output of the position detector and an output of the force measurer, so that pressing force applied to the mold by the roller is a predetermined value and moment applied to the roller is a predetermined value,
and wherein the roller hemming device further comprises a movement controller for controlling the movement of the roller so that a predetermined force is applied to the roller in a direction perpendicular to both the pressing direction of the roller against the mold and a traveling direction of the roller, by using the output of the force measurer, during the pre-hemming or hemming process,
wherein the apparatus further comprises:
a force measurement device for determining force applied to the roller along a traveling direction of the roller, wherein the device controls the movement of the roller so that the determined force is within a predetermined range, by using the output of the force measurement device, during the pre-hemming or hemming process.

6. The apparatus according to claim 5, further comprising a speed sensor for determining a traveling speed of the roller during the pre-hemming or hemming process based on the position of the roller obtained from the position detector, wherein the apparatus is configured to change the pressing force of the roller against the mold depending on a change in the traveling speed of the roller.

7. An apparatus, comprising:
a roller hemming device including:
  a robot manipulator and a roller attached to a front end of the robot manipulator for carrying out at least one of a pre-hemming or hemming process for a workpiece having an outer sheet mounted on a mold and an inner sheet stacked on the outer sheet, the robot manipulator configured to move the roller while the roller is pressed against the peripheral edge of the outer sheet so that the peripheral edge of the outer sheet nipped between the roller and the mold is bent;
  a position detector for detecting a current position of the roller;
  a force measurer arranged between a wrist section of the robot manipulator and the roller; and
  a controller for controlling the position of the roller by using an output of the position detector and an output of the force measurer, so that pressing force applied to the mold by the roller is a predetermined value,
  wherein the controller controls the position of the roller by using an output of the position detector and an output of the force measurer, so that pressing force applied to the mold by the roller is a predetermined value and moment applied to the roller is a predetermined value,
  and wherein the roller hemming device further comprises a movement controller for controlling the movement of the roller so that a predetermined force is applied to the roller in a direction perpendicular to both the pressing direction of the roller against the mold and a traveling direction of the roller, by using the output of the force measurer, during the pre-hemming or hemming process,
wherein the apparatus further comprises:
  a speed sensor for determining traveling speed of the roller during the pre-hemming or hemming process based on the position of the roller obtained from the position detector, wherein the apparatus is configured to change the pressing force of the roller against the mold depending on a change in the traveling speed of the roller.

* * * * *